(12) United States Patent
Oyama et al.

(10) Patent No.: US 7,649,826 B2
(45) Date of Patent: Jan. 19, 2010

(54) OPTICAL INFORMATION RECORDING REPRODUCTION DEVICE

(75) Inventors: Katsuhiro Oyama, Gunma (JP); Mitsuo Sekiguchi, Gunma (JP); Hiroya Kakimoto, Gunma (JP); Fuyuki Miyazawa, Gunma (JP)

(73) Assignee: Taiyo Yuden Co., Ltd., Tokyo (JP)

( * ) Notice: Subject to any disclaimer, the term of this patent is extended or adjusted under 35 U.S.C. 154(b) by 438 days.

(21) Appl. No.: 11/757,119

(22) Filed: Jun. 1, 2007

(65) Prior Publication Data

US 2007/0291599 A1    Dec. 20, 2007

(30) Foreign Application Priority Data

Jun. 5, 2006    (JP) ............... 2006-156022

(51) Int. Cl.
  *G11B 7/00*    (2006.01)
(52) U.S. Cl. ............... 369/112.23; 369/112.02; 369/44.23; 369/44.32
(58) Field of Classification Search ............... None
  See application file for complete search history.

(56) References Cited

U.S. PATENT DOCUMENTS 6,771,584 B2 * 8/2004 Yamanaka ............ 369/112.23
7,224,645 B2 * 5/2007 Ando et al. ............ 369/44.23

FOREIGN PATENT DOCUMENTS

| JP | 09-197264 | 7/1997 |
|---|---|---|
| JP | 09-251662 | 9/1997 |
| JP | 2006-085842 | 3/2006 |

\* cited by examiner

*Primary Examiner*—Muhammad N. Edun
(74) *Attorney, Agent, or Firm*—Knobbe Martens Olson & Bear LLP

(57) ABSTRACT

An optical information recording reproduction device is disclosed which finds the correlation between the ratio of the minimum pit amplitude to the maximum pit amplitude of an RF signal obtained from the light reflected by the pits recorded on an optical disk in a tracking servo mode and spherical aberration in advance, and stores it. In recoding information on the optical disk, the optical information recording reproduction device calculates the ratio of the minimum pit amplitude to the maximum pit amplitude of the RF signal, and compares the calculation to the stored correlation, and feeds back to an aberration correction optical system and a driving mechanical system to correct the aberration into an aplanatic state.

9 Claims, 6 Drawing Sheets

OPTICAL INFORMATION RECORDING REPRODUCTION DEVICE

BACKGROUND OF THE INVENTION

1. Field of the Invention

The present invention relates to an optical information recording reproduction device for recording signals on an optical recording medium with laser light.

2. Description of the Related Technology

Recording of information on optical recording media such as optical disks is performed in such a manner that record data is modulated by Eight to Fourteen Modulation (EFM) or Eight to Sixteen Modulation; a recording pulse is formed according to the modulation signals; the intensity and radiation timing of laser light are controlled according to the recording pulse; and thus recording pits are formed on the optical recording media.

For such optical information recording, an object lens with a large numerical aperture (NA) is effective in recording and reproducing data to/from high-density mass-storage recording media. However, the allowable variations of the laser-beam spot diameter are extremely small for the high-density mass-storage recording media and the manufacturing tolerances of optical recording media and optical pickups (thickness and warping for media, lens tilt etc. for pickups) are also significantly reduced.

A known optical information recording reproduction device adopts a method of allowing variations in spot diameter by determining the spot diameter of the laser light radiated on an optical recording medium from the level of RF signals and reading the optimum strategy for the spot from a strategy table stored in a memory and recording it (Method for Controlling Optical Disk Recording and Reproduction Device disclosed in JP-A-2006-85842).

The tolerance of optical recording media and optical pickups causes the problem of aberration. Means for reducing the aberration includes a method for preventing aberration in such a manner that a first negative lens and a second positive lens are arranged in sequence behind a collimating lens, wherein when the substrate of an optical recording medium is increased in thickness, the distance on the optical axis between the first negative lens and the second positive lens is reduced, and when the substrate of the optical recoding medium is decreased in thickness, the distance on the optical axis between the first negative lens and the second positive lens is increased (Object Lens System Variable with Thickness of Disk Substrate disclosed in JP-A-9-197264 by Mark KK) and a method for reducing aberration by changing the distance between an object lens and an attachment lens according to the thickness of the substrate of an optical recoding medium using a pickup having the attachment lens (Apparatus and Method for Recording and Reproducing Data to/from Recording Medium disclosed in JP-A-9-251662 by Sony Corp.).

Requirements for high-recording-quality optical disk recording reproduction devices are optimization of the spot diameter of a laser beam applied on a recording medium, selection of strategy optimized for laser beam spots and the recording medium, and prevention of aberration caused by tolerance.

However, "Method for Controlling Optical Disk Recording and Reproduction Device" disclosed in JP-A-2006-85842 by SANYO Electric Co. Ltd. does not cope with the aberration, although it optimizes the strategy for laser beam spots. "Object Lens System Variable with Thickness of Disk Substrate" disclosed in JP-A-9-197264 by Mark KK does not refer to a method for determining aberration, although it shows means for correcting aberration.

"Apparatus and Method for Recording and Reproducing Data to/from Recording Medium" disclosed in JP-A-9-251662 by Sony Corp. shows a method for determining the thickness of the substrate of a recording medium by detecting a focus error (FE) signal, although it may be difficult to separate the influence of defocusing from the influence of the thickness of the substrate of the recording medium.

Accordingly, it is desirable to provide an optical information recording reproduction device capable of stable aberration detection for achieving high recording quality.

SUMMARY OF CERTAIN INVENTIVE ASPECTS

In order to achieve the above object, according to a first aspect of the invention, there is proposed an optical information recording reproduction device that applies a laser beam from an optical pickup to an optical recording medium to form pits corresponding to record information in the optical recording medium, thereby recording the information. The optical information recording reproduction device includes: an amplitude determination section configured to determine the minimum pit amplitude and the maximum pit amplitude of an RF signal obtained from the light reflected by the pits recorded on the optical recording medium, in a tracking servo mode; an aberration-state determination section configured to determine the state of aberration of a laser beam spot from the minimum pit amplitude and the maximum pit amplitude determined by the amplitude determination section; and an aberration correction section configured to correct the aberration of the laser beam spot according to the state of aberration determined.

The optical information recording reproduction device is configured to determine the state of aberration of the laser beam spot from the minimum pit amplitude and the maximum pit amplitude of an RF signal obtained from the light reflected by the pits recorded on the optical recording medium in a tracking servo mode, and to correct the aberration of the laser beam spot according to the state of aberration.

In order to achieve the above object, according to a second aspect of the invention, there is proposed an optical information recording reproduction device that applies a laser beam from an optical pickup to an optical recording medium to form pits corresponding to record information in the optical recording medium, thereby recording the information. The optical information recording reproduction device includes: an amplitude determination section configured to determine the minimum amplitude and the maximum amplitude of the envelope of an RF signal obtained from the light reflected by the optical recording medium in a non-tracking servo mode; an aberration-state determination section configured to determine the state of aberration of the laser beam spot from the minimum amplitude and the maximum amplitude determined by the amplitude determination section; and an aberration correction section configured to correct the aberration of the laser beam spot according to the state of aberration determined.

The optical information recording reproduction device is configured to determine the state of aberration of the laser beam spot from the minimum amplitude and the maximum amplitude of the envelope of the RF signal obtained from the light reflected by the optical recording medium in a non-tracking servo mode, and to correct the aberration of the laser beam spot according to the state of aberration.

The optical information recording reproduction device according to the first aspect of the invention can determine the state of aberration of the laser beam spot from the minimum pit amplitude and the maximum pit amplitude of the RF signal in a tracking servo mode, and therefore can correct the aberration of the laser beam spot according to the state of aberration. This allows stable detection and determination of aberration to allow formation of pits of correct mark and space, thereby high recording quality such as low error rate and wide margin and good recording quality in information-recording to high-density mass-volume optical recording media can be obtained.

The optical information recording reproduction device according to the second aspect of the invention can determine the state of aberration of the laser beam spot from the minimum amplitude and the maximum amplitude of the envelope of the RF signal in a non-tracking servo mode, and therefore can correct the aberration of the laser beam spot according to the state of aberration. This allows stable detection and determination of aberration to allow formation of pits of correct mark and space, thereby high recording quality such as low error rate and wide margin and good recording quality in information-recording to high-density mass-volume optical recording media can be obtained.

DESCRIPTION OF CERTAIN INVENTIVE EMBODIMENTS

There is shown a first embodiment of the invention with reference to the accompanying drawings.

Figure 1:
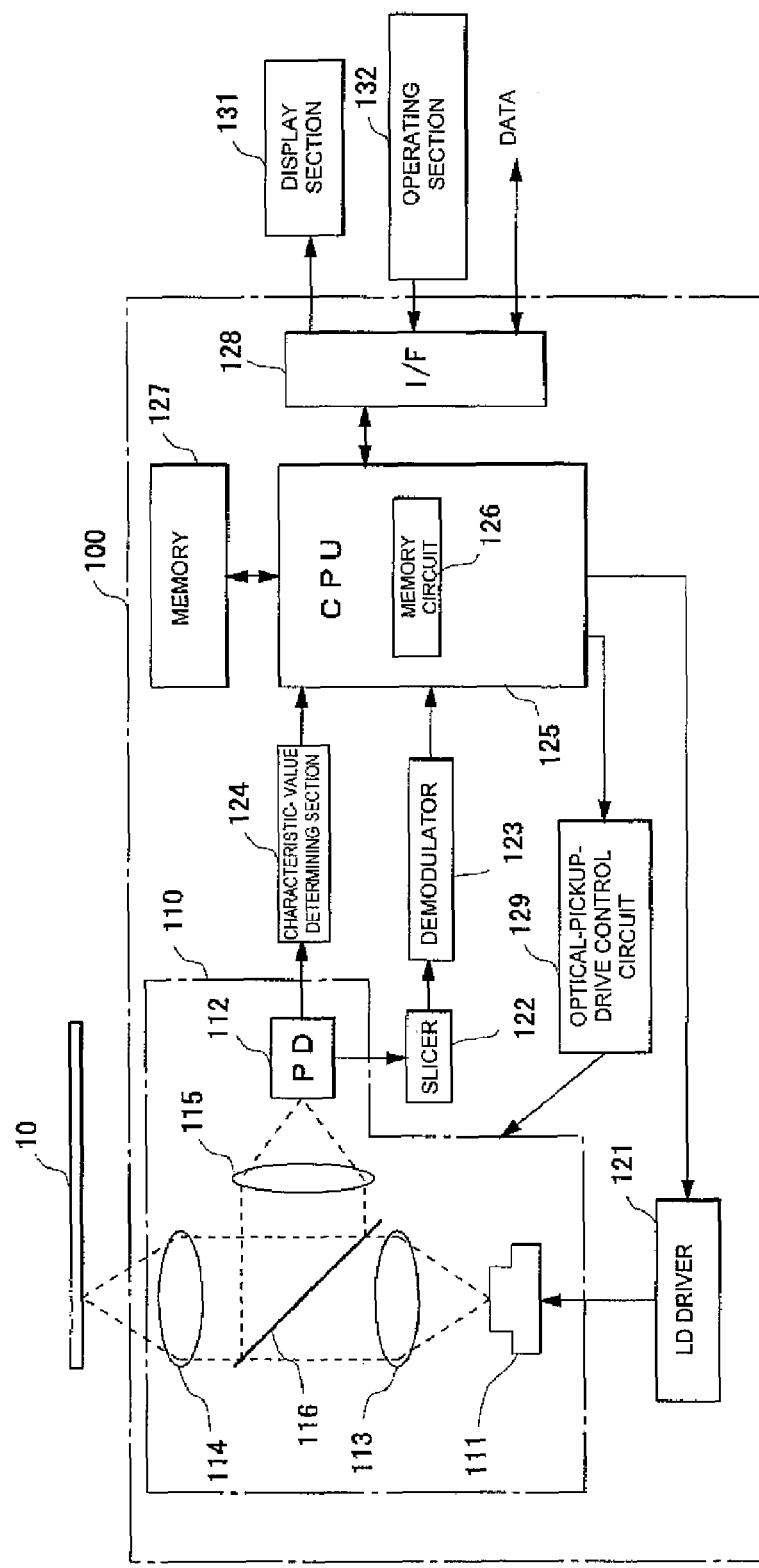
FIG. 1 is a block diagram of an optical information recording reproduction device according to an embodiment of the invention.

FIG. 1 is a diagram of the structure of an optical information recording device and an optical disk (optical recoding medium) according to an embodiment of the invention. Referring to the drawing, reference numeral 10 indicates an optical disk, or a well-known optical recoding medium such as a DVD, HD-DVD, or Blu-ray disk.

Reference numeral 100 denotes an optical information recording device, which includes an optical pickup 110, a laser diode (hereinafter, referred to as an LD) driver 121, a slicer 122, a demodulator 123, a characteristic-value determining section 124, a single-chip CPU element (hereinafter, referred to as an CPU) 125, a memory 127, an interface (hereinafter, referred to as an I/F) 128, and an optical-pickup-drive control circuit 129. Here, only the components related will be described.

The optical information recording device 100 connects to a display section 131 such as a personal computer or a display and an operating section 132 including a keyboard.

The optical pickup 110 includes an LD 111, a photo detector (hereinafter, referred to as a PD) 112, a collimating lens 113, an object lens 114, a detection lens 115, and a beam splitter 116. A laser beam emitted from the LD 111 passes through the collimating lens 113, the beam splitter 116, and the object lens 114 onto the optical disk 10.

The laser beam reflected by the optical disk 10 passes through the object lens 114, and is then reflected by the beam splitter 116 into the PD 112 through the detection lens 115. The PD 112 outputs an electric current of a value corresponding to the amount of incident light.

The LD driver 121 feeds the LD 111 with a driving current in response to a recording signal input from the CPU 125 to cause the LD 111 to emit light.

The slicer 122 slices the current output from the PD 112 with a predetermined threshold to convert it into a binary voltage signal and outputs it.

The demodulator 123 is a circuit that demodulates the coded binary signal output from the slicer 122, and outputs it to the CPU element 125. For example, the demodulator 123 demodulates a coded digital signal that is EFM-modulated at a pulse width ranging from 3T to 11T which is the binary signal output from the slicer 122, and outputs it to the CPU 125.

The characteristic-value determining section 124 receives the current signal output from the PD 112, reproduces an RF signal from the light reflected from the optical disk 10 according to the current value, determines characteristic values from the RF signal, and outputs them to the CPU 125 as digital information. The characteristic values to be determined from the reflected light include the minimum pit amplitude and the maximum pit amplitude of the RF signal in a tracking servo mode, the minimum amplitude and the maximum amplitude of the envelope of the RF signal in a no tracking servo mode, and other known characteristic values such as β, asymmetry, phase, and amplitude, which depend on recording laser power and recording pulse conditions and are suitable for optimizing the recording pulse conditions.

The CPU 125 is a known single-chip CPU element, which has a memory circuit 126 in which a computer program for operating the CPU is stored. The CPU 125 controls a driving mechanism (not shown) to control the position, tracking, and focusing of the optical pickup 110 and the driving of the rotation of the optical disk 10, and records (writes) information input from an external unit according to the data table stored in the memory 127 on the optical disk 10, or reads information stored in the optical disk 10 and outputs it to an external unit. The CPU 125 tests the optical disk 10 at the recording of information for the optimum laser beam conditions to allow information recording.

The memory 127 is connected to the CPU 125. The data table in the memory 127 stores data corresponding to a variety of optical disks as a strategy table.

Figure 2:
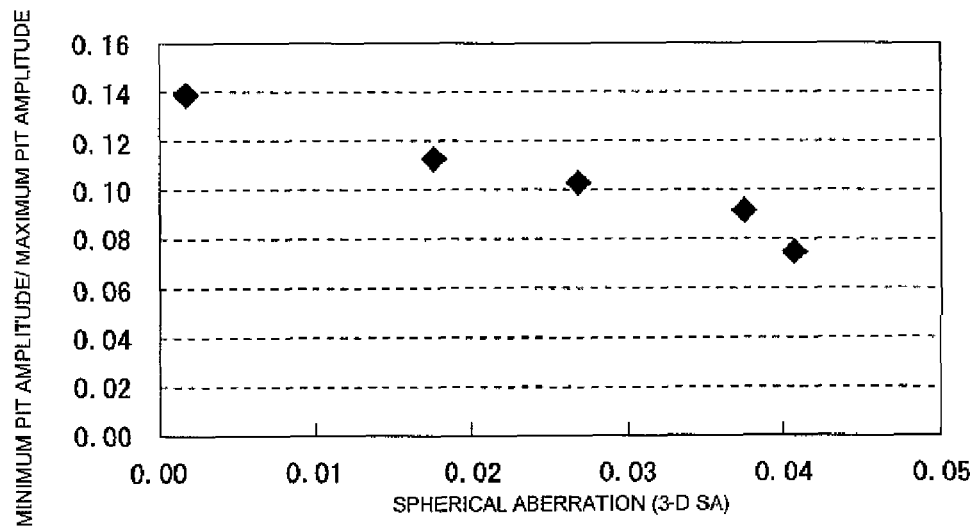
FIG. 2 is a graph showing the correlation between the ratio of the minimum pit amplitude to the maximum pit amplitude of an RF signal and spherical aberration according to an embodiment of the invention.
Figure 3:
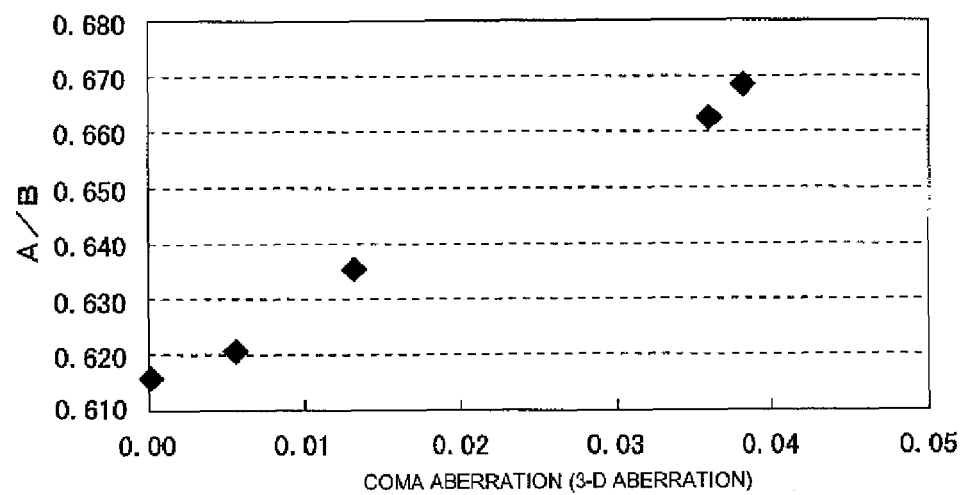
FIG. 3 is a graph showing the correlation between the ratio of the minimum amplitude to the maximum amplitude of the envelope of an RF signal and coma aberration according to an embodiment of the invention.

The memory 127 further stores information on the correlation between the ratio of the minimum pit amplitude to the maximum pit amplitude of an RF signal and the spherical aberration, as shown in FIG. 2, and information on the correlation between the ratio of the minimum amplitude A to the maximum amplitude B of a detection signal in a no tracking servo mode, as shown in FIG. 3, and coma aberration is recorded as correlation functions on data tables.

Figure 4:
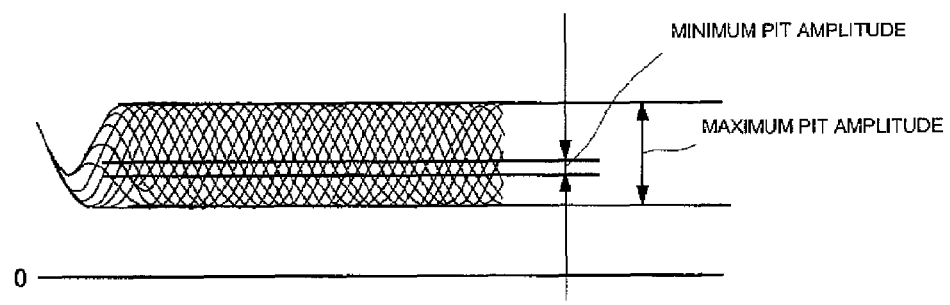
FIG. 4 is a diagram of the minimum pit amplitude and the maximum pit amplitude of an RF signal according to an embodiment of the invention.

The correlations shown in FIGS. 2 and 3 are obtained in advance by experiment. The correlation on spherical aberration, shown in FIG. 2, is obtained by driving the optical pickup 110 while rotating the optical disk 10 in a tracking servo mode to reproduce an RF signal, with the thickness of the optical disk 10 varied so as not to cause spherical aberration or to cause spherical aberration, and finding the minimum pit amplitude and the maximum pit amplitude shown in FIG. 4 from the RF signal.

Figure 5:
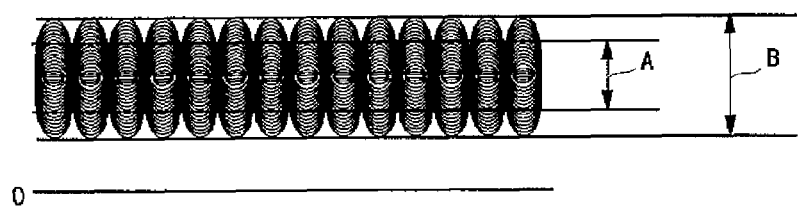
FIG. 5 is a diagram of the minimum amplitude and the maximum amplitude of the envelope of an RF signal according to an embodiment of the invention.

The correlation on coma aberration, shown in FIG. 3, is obtained by driving the optical pickup 110 while rotating the optical disk 10 in a non-tracking servo mode to reproduce an RF signal, with the warp of the optical disk 10 varied so as not to cause coma aberration or to cause coma aberration, and finding the minimum amplitude A and the maximum amplitude B of the envelope of the RF signal, as shown in FIG. 5. The non-tracking servo mode allows the laser beam spot to be radiated on both the known groove and the other portion on the optical disk 10, thus permitting the RF signal to contain lights reflected from both of the portions, which facilitates grasping occurrence of coma aberration of the laser beam spot.

Figure 6:
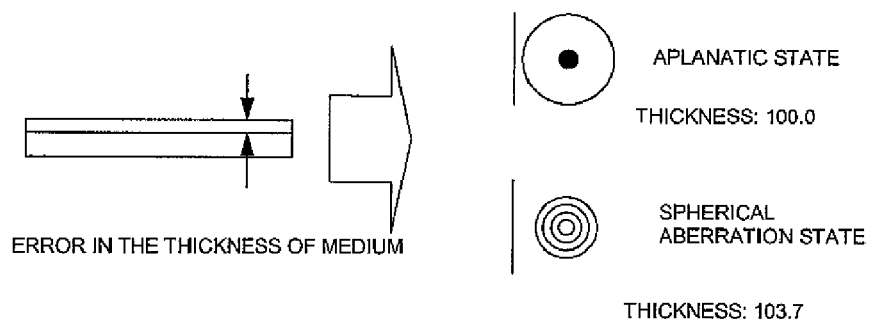
FIG. 6 is a diagram showing the state of spherical aberration according to an embodiment of the invention.
Figure 7:
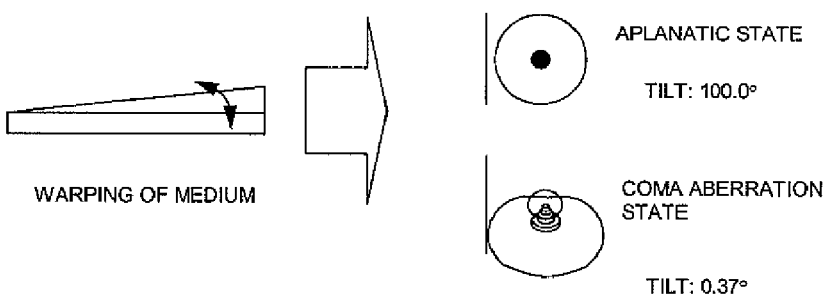
FIG. 7 is a diagram showing the state of coma aberration according to an embodiment of the invention.

FIGS. 6 and 7 show known changes in a laser beam spot caused by aberration. FIG. 6 shows a spherical aberration due to an error in the thickness of the substrate of the optical disk 10 (optical recoding medium), showing the state of a laser beam spot on the recording surface of the optical disk in an aplanatic state and in the state of aberration. This shows that the error in the thickness of the optical disk 10 causes spherical aberration, that is, spherical aberration occurs at a thickness of 103.7 µm, although no aberration occurs at a thickness of 100.0 µm.

FIG. 7 shows a coma aberration along the radius of the optical disk 10 due to a warp of the substrate of the optical disk 10 (optical recoding medium), showing the state of a laser beam spot on the recording surface of the optical disk in an aplanatic state and in the state of coma aberration. This shows that the warp of the optical disk 10 causes coma aberration, that is, coma aberration occurs at a tilt of 0.37 degree, although no aberration occurs at a tilt of 0.00 degree.

The aberrations occurs because of not only an error in the thickness of the optical disk 10 and the warp of the optical disk 10 but also a lens tilt disturbance, an error in the refractivity of the optical disk 10, and variations in the frequency of the laser beam.

FIG. 2 shows the correlation between the ratio of the minimum pit amplitude to the maximum pit amplitude and spherical aberration, where a vertical axis indicates the ratio of the minimum pit amplitude to the maximum pit amplitude and a horizontal axis indicates the spherical aberration. When the spherical aberration is 0.00, 0.18, 0.26, 0.38, and 0.41, the ratio of the minimum pit amplitude to the maximum pit amplitude is 0.14, 0.115, 0.102, 0.95, and 0.75, respectively.

FIG. 3 shows the correlation between the ratio (A/B) of the minimum amplitude A to the maximum amplitude B and coma aberration, where a vertical axis indicates the ratio (A/B) of the minimum amplitude A to the maximum amplitude B and a horizontal axis indicates the coma aberration. When the coma aberration is 0.00, 0.005, 0.13, 0.37, and 0.39, the ratio (A/B) of the minimum amplitude A to the maximum amplitude B is 0.615, 0.620, 0.635, 0.662, and 0.668, respectively.

The I/F 128 is an interface that connects the CPU 125 with the external display section 131 and operating section 132, and transfers recording and reproducing information between an external unit and the CPU 125.

The optical-pickup-drive control circuit 129 controls the driving of the optical pickup 110 according to the control instruction from the CPU 125. The driving control includes tracking control, focusing control, and tilt control.

With the above structure, the optical information recording device 100 executes recording and reproduction of information to/from the optical disk 10 using a laser beam output from the LD 111, and sends and receives the information to/from an external unit such as a personal computer (PC).

When recording information on the optical disk 10, the optical information recording device 100 encodes the record information, processes the coded record information by the CPU 125 to thereby determine a strategy as recording conditions for the optical disk 10, converts the strategy to a recording pulse by the LD driver 121, and outputs a laser beam pulsed according to the recording pulse from the LD 111.

The LD driver 121 drives the LD 111 according to the input recording pulse. The LD 111 controls the output laser beam according to the recording pulse, and radiates the controlled laser beam to the optical disk 10 rotating at a constant linear speed or a constant rotating speed through the collimating lens 113, the beam splitter 116, and the object lens 114, thereby recording a record pattern with a pit and space train corresponding to the desired record information.

When recording information on the optical disk 10, the optical information recording device 100 records test information on the test region of the optical disk 10 and reproduces it, as is well known, to determine the optimum laser-beam radiating conditions.

The detection, determination, and correction of aberration according to the embodiment will be described in detail herein below.

Figure 8:
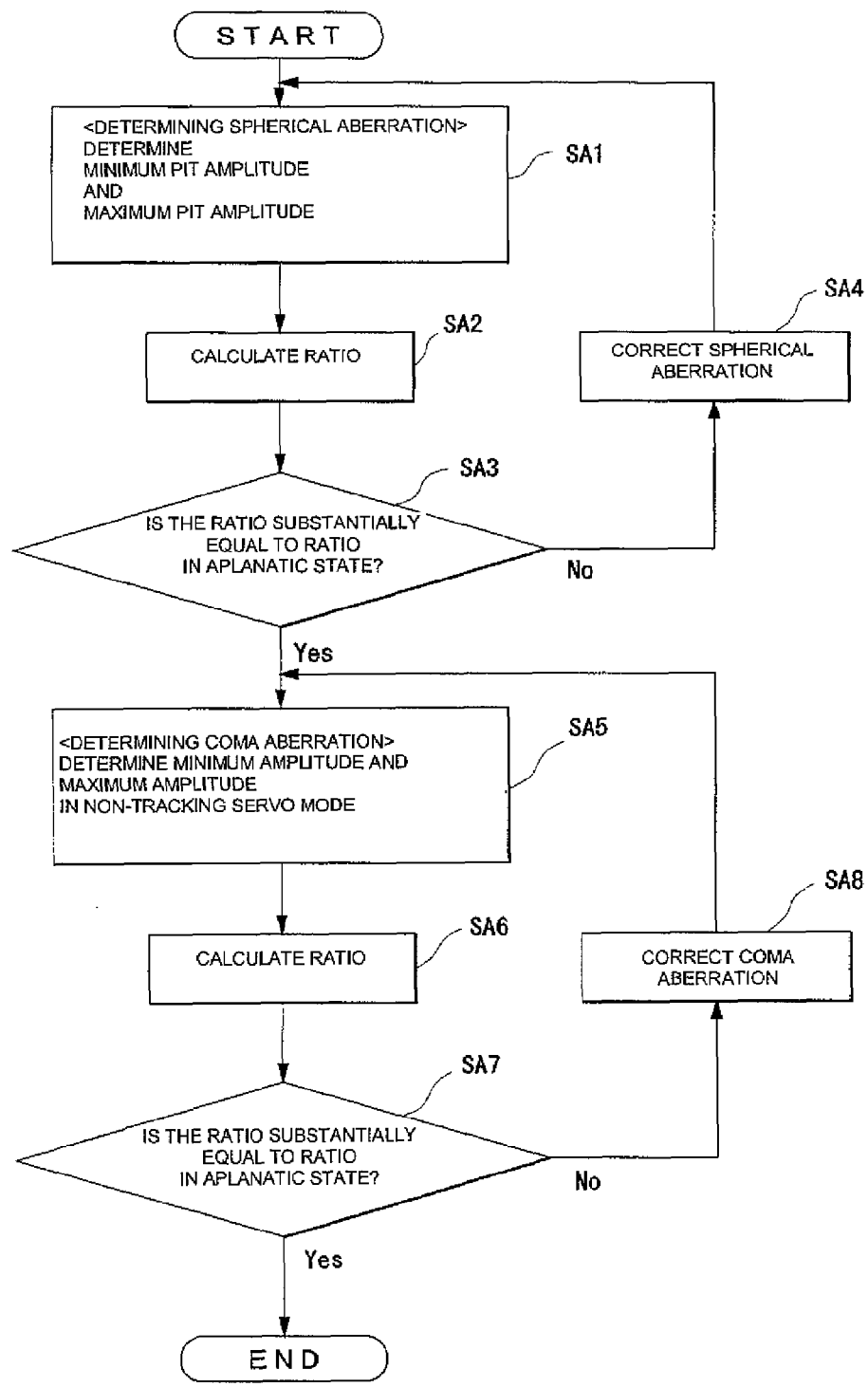
FIG. 8 is a flowchart for aberration correction processing according to an embodiment of the invention.

In this embodiment, aberration correction control is executed when information is recorded on the optical disk 10, as shown in the flowchart of FIG. 8.

In the aberration correction control process, the CPU 125 rotates the optical disk 10 and drives the optical pickup 110 in a tracking servo mode to reproduce an RF signal from the information stored in the optical disk 10, and determines the minimum pit amplitude and the maximum pit amplitude from the RP signal (step SA1).

The CPU 125 then calculates the ratio of the detected minimum pit amplitude to the detected maximum pit amplitude (the minimum pit amplitude/the maximum pit amplitude) by computation. That is, the CPU 125 divides the minimum pit amplitude by the maximum pit amplitude (step SA2).

The CPU 125 then compares the information on the correlation between the ratio of the minimum pit amplitude to the maximum pit amplitude of an RF signal stored in the memory 127 and spherical aberration to the ratio calculated by the operation in step SA2 to determine whether the calculated ratio (calculated value) is substantially equal to that in a aplanatic state (step SA3).

When the calculated value is not substantially equal to that in an aplanatic state, the CPU 125 determines that spherical aberration has occurred, and therefore corrects the spherical aberration through the optical-pickup-drive control circuit 129 (step SA4), and returns to the process of step SA1. For this spherical aberration correction, the CPU 125 feeds back to an aberration correction optical system and a driving mechanical system which are controlled by the optical-pickup-drive control circuit 129.

When the calculation in step SA3 is substantially equal to that in an aplanatic state, that is, when the calculation is within a predetermined tolerance to that in an aplanatic state, the CPU 125 drives the optical pickup 110 in a non-tacking servo mode while rotating the optical disk 10 to reproduce an RF signal from the information stored in the optical disk 10, and determines the minimum amplitude A and the maximum amplitude B of the envelope of the RF signal (step SA5).

The CPU 125 then calculates the ratio (A/B) of the detected minimum amplitude A to the detected maximum amplitude B by operation, that is, divides the minimum amplitude A by the maximum amplitude B (step SA6).

Furthermore, the CPU 125 compares the information on the correlation between the ratio of the minimum amplitude A to the maximum amplitude B of the envelope of the RF signal which is stored in the memory 127 and coma aberration to the ratio calculated by the operation in step SA6 to determine whether the calculated ratio (calculated value) is substantially equal to that in an aplanatic state (step SA7).

When the calculated value is not substantially equal to that in an aplanatic state, the CPU 125 determines that coma aberration has occurred, and therefore corrects the coma aberration through the optical-pickup-drive control circuit 129 (step SA8), and returns to the process of step SA5. For this coma aberration correction, the CPU 125 feeds back to an aberration correction optical system and a driving mechanical system which are controlled by the optical-pickup-drive control circuit 129.

When the calculation in step SA8 is substantially equal to that in an aplanatic state, that is, when the calculation is within a predetermined tolerance to that in an aplanatic state, the CPU 125 terminates the aberration correction processing.

The amount of defocusing may be determined in parallel with the detection of an FE signal during aberration correction processing.

Aberration may be detected from a reproduction signal in the data region of the optical disk 10 while information recording operation is temporarily stopped, and then the process may be fed back to the aberration correction system. The signal to be reproduced may be a pit pattern recorded on the optical disk 10 or new information recorded on the test region of the optical disk 10 may be reproduced.

Figure 9:
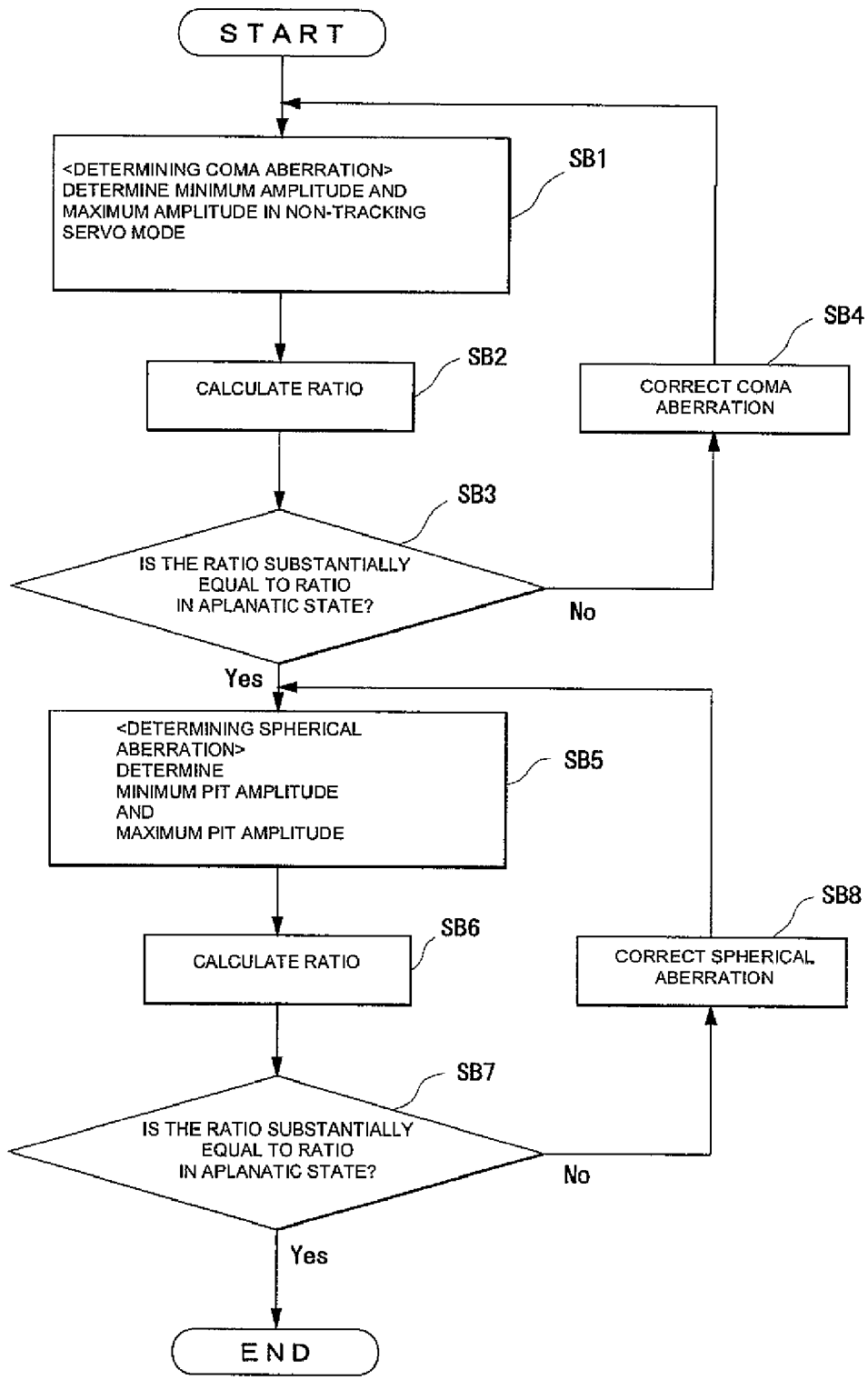
FIG. 9 is a flowchart of another example of aberration correction processing according to an embodiment of the invention.

In the foregoing aberration correction processing, the spherical aberration correction in steps SA1 to SA4 is first executed and then the coma aberration correction in steps SA5 to SA8 is executed. Alternatively, after the coma aberration correction in steps SB1 to SB4 has been executed, the spherical aberration correction in steps SB5 to SB8 may be executed, as shown in the flowchart of FIG. 9. The process of coma aberration correction in steps SB1 to SB4 of the flowchart in FIG. 9 is the same as the process of coma aberration correction in steps SA5 to SA8 of FIG. 8, and the process of spherical aberration correction in steps SB5 to SB8 is the same as the process of spherical aberration correction in steps SA1 to SA4 of FIG. 8.

This embodiment specifies the minimum amplitude by the maximum amplitude to allow separation from the factors of changing the minimum amplitude, such as the excess or deficiency of recording laser light power.

Thus, this embodiment allows determination of aberration from an RF signal. Therefore, controlling with feeding back to the optical system and the driving mechanical system for correcting aberration according to the determined aberration ensures high-quality recording.

The optimum amount of aberration using a signal may be either zero or the value obtained for the test region of the optical disk 10.

The foregoing description details certain embodiments of the invention. It will be appreciated, however, that no matter how detailed the foregoing appears in text, the invention may be practiced in many ways. It should be noted that the use of particular terminology when describing certain features or aspects of the invention should not be taken to imply that the terminology is being re-defined herein to be restricted to including any specific characteristics of the features or aspects of the invention with which that terminology is associated.

While the above detailed description has shown, described, and pointed out novel features of the invention as applied to various embodiments, it will be understood that various omissions, substitutions, and changes in the form and details of the device or process illustrated may be made by those skilled in the technology without departing from the spirit of the invention. The scope of the invention is indicated by the appended claims rather than by the foregoing description. All changes which come within the meaning and range of equivalency of the claims are to be embraced within their scope.

What is claimed is:

1. An optical information recording reproduction device that applies a laser beam from an optical pickup to an optical recording medium to form pits corresponding to record information in the optical recording medium, thereby recording the information, the optical information recording reproduction device comprising:
   an amplitude determination section configured to determine the minimum pit amplitude and the maximum pit amplitude of an RF signal obtained from the light reflected by the pits recorded on the optical recording medium, in a tracking servo mode;
   an aberration-state determination section configured to determine the state of aberration of a laser beam spot from the minimum pit amplitude and the maximum pit amplitude determined by the amplitude determination section; and
   an aberration correction section configured to correct the aberration of the laser beam spot according to the state of aberration determined.

2. The optical information recording reproduction device according to claim 1, wherein the aberration-state determination section comprises:
   a storage section in which the correlation between the ratio of the minimum pit amplitude to the maximum pit amplitude of the RF signal and the amount of aberration is stored in advance;
   an operating section configured to calculate the ratio of the minimum pit amplitude to the maximum pit amplitude determined by the amplitude determination section; and
   a determination section configured to determine the state of aberration by comparing the ratio calculated by the operating section to the correlation stored in the storage section.

3. The optical information recording reproduction device according to claim 2, wherein the aberration-state determination section determines the amount of spherical aberration as the state of aberration.

4. An optical information recording reproduction device that applies a laser beam from an optical pickup to an optical recording medium to form pits corresponding to record information in the optical recording medium, thereby recording the information, the optical information recording reproduction device comprising:
   an amplitude determination section configured to determine the minimum amplitude and the maximum amplitude of the envelope of an RF signal obtained from the light reflected by the optical recording medium in a non-tracking servo mode;

an aberration-state determination section configured to determine the state of aberration of the laser beam spot from the minimum amplitude and the maximum amplitude determined by the amplitude determination section; and an aberration correction section configured to correct the aberration of the laser beam spot according to the state of aberration determined.

5. The optical information recording reproduction device according to claim 4, wherein the aberration-state determination section comprises:

a storage section in which the correlation between the ratio of the minimum amplitude to the maximum amplitude and the amount of aberration is stored in advance;

an operating section configured to calculate the ratio of the minimum amplitude to the maximum amplitude determined by the amplitude determination section; and a determination section configured to determine the state of aberration by comparing the ratio calculated by the operating section to the correlation stored in the storage section.

6. The optical information recording reproduction device according to claim 5, wherein the aberration-state determination section determines the amount of coma aberration as the state of aberration.

7. A method of optimizing optical information recording using an optical information recording reproduction device, the method comprising:

applying a laser beam from an optical pickup to an optical recording medium to form pits corresponding to record information in the optical recording medium;

in a tracking servo mode, determining the minimum pit amplitude and the maximum pit amplitude of an RF signal obtained from the light reflected by the pits recorded on the optical recording medium;

determining the state of aberration of a laser beam spot from the minimum pit amplitude and the maximum pit amplitude; and correcting the aberration of the laser beam spot according to the state of aberration determined.

8. A method of optimizing optical information recording using an optical information recording reproduction device, the method comprising:

determining the minimum amplitude and the maximum amplitude of the envelope of an RF signal obtained from the light reflected by the optical recording medium in a non-tracking servo mode;

determining the state of aberration of the laser beam spot from the minimum amplitude and the maximum amplitude determined; and correcting the aberration of the laser beam spot according to the state of aberration determined.

9. An optical information recording reproduction device comprising:

means for applying a laser beam from an optical pickup to an optical recording medium to form pits corresponding to record information in the optical recording medium;

means for determining, in a tracking servo mode, the minimum pit amplitude and the maximum pit amplitude of an RF signal obtained from the light reflected by the pits recorded on the optical recording medium, and for determining, in a non-tracking servo mode, the minimum amplitude and the maximum amplitude of the envelope of an RF signal obtained from the light reflected by the optical recording medium;

means for determining the state of aberration of a laser beam spot from the minimum and maximum pit amplitude and/or the minimum and maximum amplitude; and means for correcting the aberration of the laser beam spot according to the state of aberration determined.

* * * * *